E. D. & E. W. KITCHEN.

BUTTER-WORKER.

No. 7,793. Reissued July 17, 1877.

Witnesses

Saml. J. Van Stavoren

Jos. B. Connolly

Inventor

Ebenezer D. Kitchen,

Emanuel W. Kitchen,

By Connolly Bros., Attorneys

N. PETERS, PHOTO-LITHOGRAPHER, WASHINGTON, D. C.

UNITED STATES PATENT OFFICE.

EBENEZER D. KITCHEN AND EMANUEL W. KITCHEN, OF BUCKINGHAM TOWNSHIP, BUCKS COUNTY, PENNSYLVANIA.

IMPROVEMENT IN BUTTER-WORKERS.

Specification forming part of Letters Patent No. 186,852, dated January 30, 1877; Reissue No. 7,793, dated July 17, 1877; application filed March 15, 1877.

*To all whom it may concern:*

Be it known that we, EBENEZER D. KITCHEN and EMANUEL W. KITCHEN, of Buckingham township, in the county of Bucks and State of Pennsylvania, have invented certain new and useful Improvements in Butter-Workers and Churns; and we do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
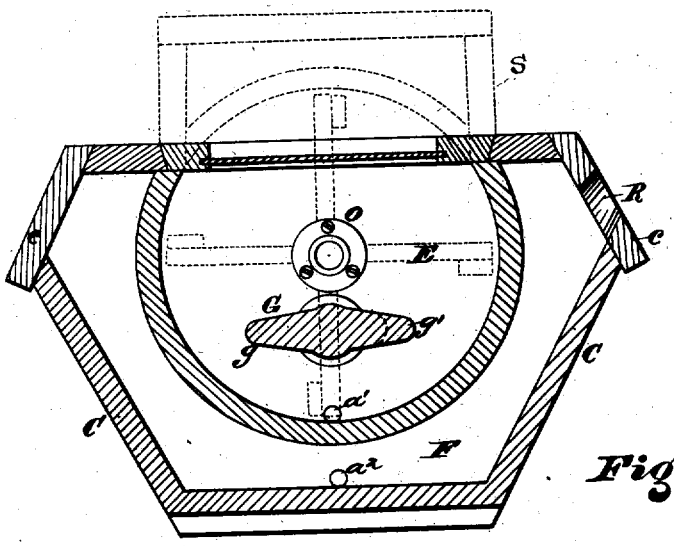
Figure 2:
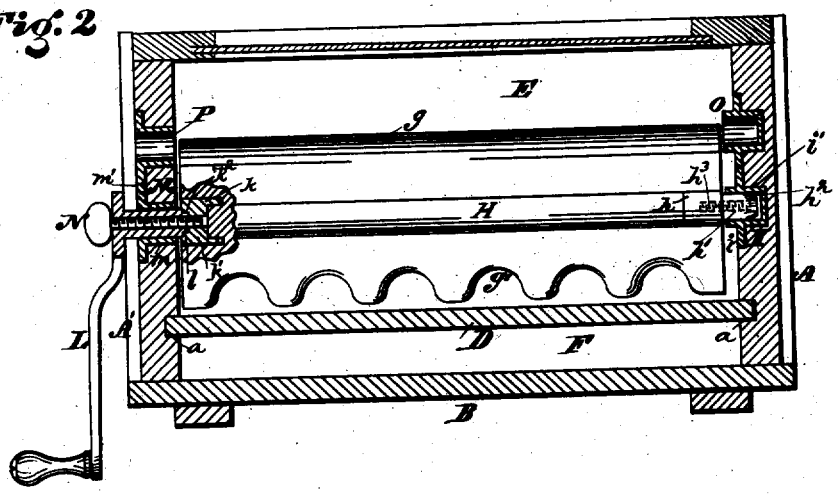

Figure 1 is a transverse vertical section, and Fig. 2 a longitudinal vertical section.

Our invention consists in the peculiar construction and combination of parts, as hereinafter more fully described, having reference particularly—

First, to the construction of the butter-worker paddle, which is straight on one side and scalloped or indented on the other.

Second, to the construction of the vessel in which the butter is made and worked, said vessel consisting of a box with straight sides and ends, the latter having circular grooves, in which is fitted a curved or bent board or plate, which forms or incloses the working-compartment. Between the outer sides of the box and the bent or curved board forming the sides of the working compartment is a chamber, which serves as a receptacle for hot or cold water or ice.

Third, to the construction and combination of devices by which the butter-worker paddle is held in place, said devices being adapted to permit said paddle to be removed and a churn-dasher inserted in the working compartment, and vice versa.

Referring to the accompanying drawing, A A′ designate the ends, B the bottom, and C *c* the outer straight sides, of a box or vessel. The ends A A′ are grooved at *a a* for the reception of a circular or bent board or plate, D, which forms the bottom and sides of the working compartment E. By means of this simple construction we obtain a working compartment having curved or convex sides and bottom, while the ends are fitted and held together between straight sides, which are easily and cheaply made, and produce a very substantial structure. This construction also obtains for us the chamber F, which serves as a receptacle for hot or cold water or ice to regulate the temperature of the milk or butter.

$a^1$ $a^2$ are openings in the end A or A′, for drawing off the milk and water from the working compartment E and ice or water chamber F, respectively.

G represents the paddle of the butter-worker, consisting of a bar or plate having one straight edge, *g*, the other being transversely grooved or creased, as shown at *g′*. A paddle of this construction will crease the butter longitudinally with its straight side, and then transversely with the grooved side, thus working the mass in the most thorough and effectual manner.

H represents the shaft of the butter-worker, having at one end a ferrule, *h*, with projecting gudgeon or journal $h^1$, rounded at $h^2$, for a purpose hereinafter more fully set forth. Said ferrule is held on the shaft by the screw $h^3$ inserted in the end of the latter, as shown.

I is a box, consisting of the plate *i*, with hollow boss *i′*, in which the journal of the shaft H fits and turns. The end A of the vessel is countersunk for the reception of the box I, which is held in place by screws passing through the plate *i′*, the latter being flush with the wood in which it fits.

The opposite end of the shaft H is provided with a ferrule, *k*, which has no projecting journal, being formed in lieu thereof with a nut, $k^1$, the outer face of which has a square socket, $k^2$, for the reception of the squared shoulder *l* of the handle L.

M is a box fitted in the side A′ of the vessel, consisting of a boss, *m*, and plate *m′*, said plate being flush with the outer side of the end A′, and said boss passing through the said end A′ to the inside, as shown. The handle L passes through this box, a set-screw, N, being swiveled in said handle, and entering the nut *k*. To remove the butter-worker from the vessel E the set-screw N and handle L are withdrawn. The paddle G being brought to a horizontal position—that is, with its two edges in the same plane—its free end, from which the screw N has been previously removed, is raised, the rounded extremity of the journal *h* permitting this movement to be effected without binding. As soon as its free end is raised a sufficient distance for that purpose, the paddle is moved longitudinally, drawing its journal *h* out of the box I. The removal is then completed by simply lifting the paddle out of the vessel E. To insert the paddle or butter-worker, the movements described are simply reversed.

Above the boxes I and M are similar boxes O P, in which a churn-dasher of suitable construction may be secured in place in the same manner as the butter-worker G when the latter is removed.

R is an opening for introducing water or ice to the chamber F, and S is a lid or cover formed of a wooden frame, with glass or other transparent material inserted, so that the operator can observe the contents of the working-chamber E without disturbing its temperature or interfering with the operation by removing said lid.

What we claim as our invention is—

1. The butter-worker paddle G, having a straight side, *g*, and scalloped or indented side *g'*, substantially as shown and described.

2. The vessel herein described, consisting of the ends A A', bottom B, straight sides C, and curved board or plate D, fitting in grooves in said ends, and forming the working compartment E, and water and ice chamber F, substantially as shown and described.

3. A vessel having separate boxes or bearings for the reception of the journals of a butter-worker paddle and churn-dasher, substantially as shown and described.

4. In combination with the vessel described, adapted for use in churning or butter-working, of the socket-bearings I O and open bearings M P, the bearings O P being above the bearings I M, substantially as set forth and shown.

5. The combination of shaft H, having projecting gudgeon or journal $h^1$ at one end, and nut $k^1$ at the other end, boxes I and M, hollow journal or handle L, and screw N, the several parts being constructed and arranged substantially as shown and described.

In testimony that we claim the foregoing we have hereunto set our hands this 1st day of March, 1877.

EBENEZER D. KITCHEN.
EMANUEL W. KITCHEN.

Witnesses:
SAML. J. VAN STAVOREN,
CHAS. F. VAN HORN.